United States Patent
Wang et al.

(10) Patent No.: US 10,654,028 B2
(45) Date of Patent: May 19, 2020

(54) CATALYST FOR CATALYZING FORMALDEHYDE OXIDATION AND THE PREPARATION AND USE OF THE SAME

(71) Applicant: Lumileds Holding B.V., Schiphol (NL)

(72) Inventors: Jiangliang Wang, Shanghai (CN); Chen Cai, Shanghai (CN); Xiaoqiang Li, Aachen (DE)

(73) Assignee: Lumileds Holding B.V., Schiphol (NL)

( * ) Notice: Subject to any disclaimer, the term of this patent is extended or adjusted under 35 U.S.C. 154(b) by 0 days.

(21) Appl. No.: 16/230,439

(22) Filed: Dec. 21, 2018

(65) Prior Publication Data
US 2019/0193055 A1    Jun. 27, 2019

(30) Foreign Application Priority Data

Dec. 22, 2017 (WO) ............... PCT/CN2017/117930
Jan. 17, 2018 (EP) .................................. 18152150

(51) Int. Cl.
| | |
|---|---|
| *B01J 23/34* | (2006.01) |
| *B01J 21/04* | (2006.01) |
| *B01J 31/06* | (2006.01) |
| *B01J 37/00* | (2006.01) |
| *B01D 53/86* | (2006.01) |
| *B01J 37/08* | (2006.01) |
| *B01J 37/04* | (2006.01) |
| *B01J 37/14* | (2006.01) |
| *B01J 29/08* | (2006.01) |

(52) U.S. Cl.
CPC .......... *B01J 23/34* (2013.01); *B01D 53/8668* (2013.01); *B01J 21/04* (2013.01); *B01J 29/08* (2013.01); *B01J 31/06* (2013.01); *B01J 37/0072* (2013.01); *B01J 37/04* (2013.01); *B01J 37/08* (2013.01); *B01J 37/14* (2013.01); *B01D 2255/2073* (2013.01); *B01D 2255/2092* (2013.01); *B01D 2255/50* (2013.01); *B01D 2257/708* (2013.01); *B01D 2257/7022* (2013.01); *B01D 2259/4508* (2013.01)

(58) Field of Classification Search
CPC ... B01J 23/34; B01J 21/04; B01J 29/08; B01J 31/06; B01J 37/0072; B01J 37/04; B01J 37/08; B01J 37/14; B01J 2523/72; B01D 53/8668; B01D 2255/2073; B01D 2255/2092; B01D 2255/50; B01D 2257/7022; B01D 2257/708; B01D 2259/4508
USPC .......................................... 502/324
See application file for complete search history.

(56) References Cited

U.S. PATENT DOCUMENTS

| 2015/0132669 A1* | 5/2015 | Garsuch ................. B01J 21/18 |
| | | 429/405 |
| 2015/0247095 A1* | 9/2015 | Ramirez Corredores .................. |
| | | C10G 1/08 |
| | | 585/240 |
| 2019/0338194 A1* | 11/2019 | Brodeur-Campbell ..................... |
| | | C10G 45/06 |

FOREIGN PATENT DOCUMENTS

| CN | 1824383 | * | 8/2006 | ............. B01J 23/34 |
| JP | 2014-140816 | * | 8/2014 | ............. B01D 53/86 |
| JP | 2014140816 A | | 8/2018 | |

* cited by examiner

*Primary Examiner* — Patricia L. Hailey
(74) *Attorney, Agent, or Firm* — Volpe and Koenig, P.C.

(57) ABSTRACT

The present invention relates to a catalyst comprising manganese oxides wherein the manganese oxides comprise: MnO in an amount of 40-60 mole %, based on mole of Mn; $Mn_2O_3$ in an amount of 40-60 mole %, based on mole of Mn; and $Mn_3O_4$ in an amount of 1-10 mole %, based on mole of Mn. The present invention also relates to a method for preparing the catalysts and the use of the catalyst in an air purifier. The catalyst according to the present invention can effectively catalyze formaldehyde oxidation at ambient temperature so as to effectively remove indoor formaldehyde being present in relative low amounts.

14 Claims, No Drawings

CATALYST FOR CATALYZING FORMALDEHYDE OXIDATION AND THE PREPARATION AND USE OF THE SAME

FIELD OF INVENTION

The present invention generally relates to catalysts. More specially, the present invention relates to a catalyst for catalyzing formaldehyde oxidation and the preparation of the same. The inventive catalyst is especially suitable for use in air purifiers.

BACKGROUND

Formaldehyde (HCHO) is carcinogenic and teratogenic and thereby is a serious danger to human health. Formaldehyde may be emitted from industrial processes and products. It is also one of the major indoor pollutants. Along with the improvement of life quality and health consciousness of people, the demand for methods for removing formaldehyde, especially indoor formaldehyde, is increasing in recent years.

The methods used can be classified into adsorption and decomposition. The adsorption is carried out by using porous materials such as active carbon, molecular sieves, zeolites and the like to immobilize formaldehyde. After being used for some time, the porous materials are saturated and thereby cannot adsorb formaldehyde anymore, which leads to the failure of the adsorption methods. In addition, the adsorbed formaldehyde may be desorbed due to a change of conditions such as rising of the ambient temperature, which leads to secondary pollutions.

Decomposition methods may include plasma decomposition and catalytic oxidation. The catalytic oxidation converts formaldehyde into water and carbon dioxide via catalysts, which is a promising technique. The key of such techniques is to develop suitable catalysts. In recent years, transition-metal oxide catalysts and noble metal catalysts have been developed. Manganese dioxide is a relatively abundant and inexpensive material. Accordingly, manganese oxide based catalysts are developed to aerobic oxidize organic compounds.

Manganese oxide containing catalysts are also known being useful for decomposing other hazardous substances. E.g., JP2014140816A disclosed a decomposing agent for chlorine dioxide preferably containing $MnO_2$, $Mn_2O_3$, $Mn_3O_4$ (as manganese oxide) and M<I>$MnO_4$ and M<II>$MnO_4$ (as permanganate) (with M<I> an alkali and M<II> an earth alkaline metal). Quantitatively, 50 to 95% by weight of manganese oxide and 0.01-3% by weight of permanganate are preferred.

However, traditional manganese oxides like $MnO_2$ have not enough activity to do the catalysis process on indoor formaldehyde at room temperature, since indoor formaldehyde generally present at a relatively low level only.

Accordingly, there is a demand for a catalyst which is able to effectively catalyze formaldehyde oxidation and thereby can be used in an air purifier to effectively remove indoor formaldehyde present at low level.

SUMMARY

The present invention relates, in general, to the surprising discovery that manganese oxides comprising MnO, $Mn_2O_3$ and $Mn_3O_4$ in specific ratios can be used as a catalytic agent for catalyzing oxidation of formaldehyde, preferably for catalyzing oxidation of formaldehyde at room temperature, more preferably for catalyzing oxidation of indoor formaldehyde at room temperature. The manganese oxides can be prepared from the same precursor via simple operations. The discovery allows for the cost-effective production of a catalyst for applications that require high catalytic activity and durability for treating formaldehyde present at low level. The present invention also relates to the use of such a catalyst in an air purifier.

One embodiment of the present invention is a catalyst comprising manganese oxides wherein the manganese oxides comprise:

MnO in an amount of about 40-60 mole %, based on mole of Mn;

$Mn_2O_3$ in an amount of about 40-60 mole %, based on mole of Mn; and $Mn_3O_4$ in an amount of about 1-10 mole %, based on mole of Mn.

A further embodiment of the present invention is a method for preparing the catalyst as set forth above, comprising the steps of:

preparing $Mn_2O_3$ from $MnCO_3$;

preparing MnO from $MnCO_3$;

preparing $Mn_3O_4$ from MnO;

preparing a slurry comprising $Mn_2O_3$, MnO, $Mn_3O_4$, a carrier and an adhesive; and preparing the catalyst from the slurry.

An even further embodiment of the present invention is the use of the above-mentioned catalyst in an air purifier.

DETAILED DESCRIPTION OF THE PREFERRED EMBODIMENTS

The terms "room temperature" and "ambient temperature" used herein refer to a temperature of about 293K.

The term "indoor formaldehyde" used herein refers to formaldehyde contained in the air in a room. It is generally present at a relatively low level, for example, from several ppb to several ppm by weight, such as 10 to 100,000 ppb, or 20 to 10,000 ppb, or 50 to 5,000 ppb, or 100 to 1000 ppb.

The present invention discloses a catalyst comprising manganese oxides wherein the manganese oxides comprise:

MnO in an amount of about 40-60 mole %, preferably about 45-55 mole %, based on mole of Mn;

$Mn_2O_3$ in an amount of about 40-60 mole %, preferably about 45-55 mole %, based on mole of Mn; and $Mn_3O4$ in an amount of about 1-10 mole %, preferably about 4-8 mole %, based on mole of Mn. The mole percentages are based on the total mole of manganese ions in the oxides and the total of the same is 100 mole %.

Without being bound to any theory, it is believed that the manganese oxides provide a mixed valence state of $Mn^{2+}$ and $Mn^{3+}$, which facilitates the quick building up of the redox-circle for formaldehyde oxidation. This process can be shown as follows:

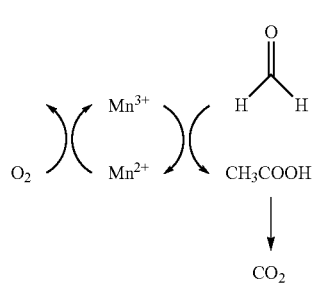

As shown above, both $Mn^{2+}$ and $Mn^{3+}$ are present in the manganese oxides, which interact with oxygen and formaldehyde in the air respectively, which in turn initiates the redox reaction between oxygen and formaldehyde and forces the reaction cycling. In this regard, it is possible to break down formaldehyde even it is present at a relatively low level only. As a result, the manganese oxides have higher activity and durability for formaldehyde oxidation as compared with traditional manganese oxides.

In one embodiment, the manganese oxides provide $Mn^{2+}$ and $Mn^{3+}$ in a mole ratio of about (0.92-1.08):1, preferably about (0.95-1.05):1, more preferably about 1:1.

The manganese oxides may be arranged on a support, for example by methods such as deposition, co-deposition, impregnation, spray drying and the like. The support can be any traditional support used with catalysts. The traditional supports generally have a large specific surface area so as to facilitate the exposure of active sites and the adsorption and diffusion of reactants and products which enhances the synergistic effects between the support and the catalytic agents. In a variant, to enhance the catalytic activity, the supports are modified with respect to their morphology to impart a shape of bar, ball and hole and the like. The preferable supports may include silica, alumina, active carbon, zeolite, molecular sieves or a combination of the same.

The catalyst comprises optionally an adhesive. In one embodiment, the adhesive is selected from the group consisting of polyvinyl alcohol, cellulose polyurethane, epoxy and acrylates. Preferably, the adhesive is selected from the group consisting of carboxymethyl cellulose, carboxyethyl cellulose, methyl cellulose, hydroxymethyl cellulose, hydroxyethyl cellulose and hydroxypropyl cellulose.

The catalyst may comprise about 20-80 wt % of manganese oxides, about 20-70 wt % carrier and about 0-50 wt % adhesive. Preferably, the catalyst may comprise about 40-70 wt % of manganese oxides, about 30-60 wt % carrier and about 0-20 wt % adhesive. More preferably, the catalyst may comprise about 50-70 wt % of manganese oxides, about 30-50 wt % carrier and about 0-10 wt % adhesive. The percentages are based on the total amount of the catalyst.

The catalyst may be used in an air purifier. In one embodiment, the catalyst is formed into a filter. For example, the catalyst may be applied on a filter substrate by for example coating, deposition, co-deposition, impregnation, spray drying and the like, to form a filter containing the catalyst. In one variant, the catalyst or the filter containing the catalyst may be used in an air purifier together with other filters. Preferably, the catalyst or the filter containing the catalyst is arranged after a particle filter, an electrostatic filter and/or an active carbon filter, as seen in the direction of air flow. Such arrangements eliminate the side effects associated with the building up of particle pollutants on the catalyst.

The method for preparing the catalyst comprises the steps of:
preparing $Mn_2O_3$ from $MnCO_3$;
preparing $MnO$ from $MnCO_3$;
preparing $Mn_3O_4$ from $MnO$;
preparing a slurry comprising $Mn_2O_3$, $MnO$, $Mn_3O_4$, a carrier and an adhesive; and
preparing the catalyst from the slurry.

Manganese carbonate is commercially available or obtainable by the methods known in the art. It is possible to use manganese-carbonate-containing materials or manganese carbonate precursors additionally or alternatively. The step of preparing $Mn_2O_3$ from $MnCO_3$ comprises the step of calcinating $MnCO_3$ at about 673-873K for about 2-6 hours in air. The step of preparing $MnO$ from $MnCO_3$ comprises the steps of: calcinating $MnCO_3$ at about 673-873K for 3-6 hours under a hydrogen atmosphere, and cooling to room temperature under a nitrogen atmosphere. The step of preparing $Mn_3O_4$ from $MnO$ comprises the steps of: aging $MnO$ at room temperature for about 3-6 hours in air, and further aging at about 673-693K for 2-6 hours in air. The step of preparing the catalyst from the slurry comprises the steps of: forming particles having a particle size of about 1-10 mm, preferred 2-3 mm, from the slurry, aging the particles for about 2-4 hours, and heating at about 473-573K for about 4-6 hours.

The manganese oxides are prepared from the same starting material which makes the preparation of the catalyst safe, simple in operation and easy to control.

EXAMPLES

The features and advantages of the invention are more obvious by the following examples. The examples are illustrative but not limiting of the invention.

Agent List:

Manganese carbonate: chemical pure, commercial available

Alumina: from Shandong branch of aluminum corporation of China limited

13× molecular sieve: from Dalian Kaiteli catalytic Engineering Technology Co Ltd Carboxymethyl cellulose: chemical pure, commercial available The Preparation Examples The manganese oxides were prepared as follow:

10 kg manganese carbonate was added into an oven and then calcinated therein at 773K for 4 hours in air. 13.80 kg $Mn_2O_3$ was obtained, as a black powder.

10 kg manganese carbonate was added into an oven. While an $H_2$ stream was passing through the oven at a rate of 10 ml/min, manganese carbonate was calcinated at 773K for 4 hours under a hydrogen atmosphere. Then, the $H_2$ stream was switched into an $N_2$ stream at a rate of 10 ml/min. After cooling to room temperature under the $N_2$ atmosphere, 7.0 kg $MnO$ was obtained, as a green powder.

3 kg $MnO$ as prepared above was added into an oven. The oven temperature was set to 293K and maintained for 3 hours in air. Then, the temperature was increased to 673K and maintained for 2 hours in air. 3.5 Kg $Mn_3O_4$ was obtained, as a brown powder.

Five catalysts having the chemical composition as shown in table 1 were prepared as follows:

$Mn_2O_3$, $MnO$ and $Mn_3O_4$ were mixed in solid phase to form a powder of manganese oxides. Then, alumina and 13× molecular sieve were added into the powder of manganese oxides. Subsequently, carboxymethylcellulose was added. To the obtained powder, 3 kg $H_2O$ was added to form a slurry. The slurry was squeezed in molds into pellets having a particle size of 2 mm. After aging the pellets for 2 hours and heating at 493K for 4 hours, the catalysts were obtained.

TABLE 1

The chemical composition of the catalysts

| Catalyst # | MnO (g)/ (mol %) | Mn$_2$O$_3$ (g)/ (mol %) | Mn$_3$O$_4$ (g)/ (mol %) | MnO$_2$ (g) | alumina (g) | 13X molecular sieve (g) | Carboxymethyl Cellulose (g) |
|---|---|---|---|---|---|---|---|
| 1 | 1000/48 | 1000/43 | 200/9 | — | 1000 | 500 | 30 |
| 2 | 1420/47 | 1580/47 | 200/6 | — | 1000 | 500 | 30 |
| 3 | 1500/47 | 1500/43 | 400/10 | — | 1000 | 500 | 30 |
| 4 (comparative) | 1000 | 1000 | — | — | 1000 | 500 | 30 |
| 5 (comparative) | 1000 | — | — | 1200 | 1000 | 500 | 30 |

Catalysts 1-3 are catalysts according to the present invention while catalysts 4-5 are comparative catalysts. The catalyst 4 was prepared by repeating the preparation of the catalyst 1 except that Mn$_3$O$_4$ was not added. The catalyst 5 was prepared by repeating the preparation of the catalyst 1 except that MnO and Mn$_3$O$_4$ was replaced with MnO$_2$.

Experimental Results:

The above prepared catalysts were sampled, broken down and pressed into particles. The particles having a particle size of 30-60 mesh were added into a testing tube with a load of 80 mg. When an air stream containing formaldehyde at 2.8 ppm (weight) was passed to the inlet of the testing tube, the time recording was started. When the concentration of formaldehyde of 0.1 ppm (weight) was detected at the outlet of the testing tube, the time recording was stopped. The time was used to characterize the ability of the catalysts on removing formaldehyde. The results were summarized in table 2.

TABLE 2 the performance of the catalysts

| Catalyst # | time (min.) | the ability on removing formaldehyde |
|---|---|---|
| 1 | 200 | good |
| 2 | 280 | good |
| 3 | 220 | good |
| 4 (comparative) | 150 | average |
| 5 (comparative) | 80 | bad |

As can be seen from the results in the above table, the catalysts according to the present invention effectively remove formaldehyde, even if formaldehyde is presented at a low concentration only. When there is no mixed valence state of Mn ions or when the manganese oxides containing manganese ions having a valence of greater than 3, the ability for removing formaldehyde drops substantially, as shown by catalyst 5. When Mn$_3$O$_4$ is not involved in the catalyst, the ability for removing formaldehyde is compromised, as shown by catalyst 4.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A catalyst comprising manganese oxides wherein the manganese oxides comprise:
   MnO in an amount of 40-60 mole %, based on mole of Mn;
   Mn$_2$O$_3$ in an amount of 40-60 mole %, based on mole of Mn; and
   Mn$_3$O$_4$ in an amount of 1-10 mole %, based on mole of Mn, and wherein the total mole of Mn in the catalyst is 100 mole %.

2. The catalyst as set forth in claim 1, wherein the manganese oxides provide Mn$^{2+}$ and Mn$^{3+}$ in a mole ratio of (0.92-1.08):1.

3. The catalyst as set forth in claim 1, further comprising a carrier.

4. The catalyst according to claim 3, wherein the catalyst comprises 20-80 wt % of manganese oxides, 20-70 wt % carrier and 0-50 wt % adhesive.

5. The catalyst as set forth in claim 3, wherein the carrier is selected from the group consisting of silica, alumina, active carbon, zeolite and molecular sieves.

6. The catalyst according to claim 3, the catalyst further comprising an adhesive being selected from the group consisting of polyvinyl alcohol, cellulose polyurethane, epoxy and acrylates.

7. The catalyst according to claim 3, the catalyst further comprising an adhesive being selected from the group consisting of carboxymethyl cellulose, carboxyethyl cellulose, methyl cellulose, hydroxymethyl cellulose, hydroxyethyl cellulose and hydroxypropyl cellulose.

8. A method for preparing the catalyst according to claim 3, comprising the steps of:
   preparing Mn$_2$O$_3$ from MnCO$_3$;
   preparing MnO from MnCO$_3$;
   preparing Mn$_3$O$_4$ from MnO;
   preparing a slurry comprising Mn$_2$O$_3$, MnO, Mn$_3$O$_4$, a carrier and an adhesive; and
   preparing the catalyst from the slurry.

9. The method according to claim 8, wherein the step of preparing Mn$_2$O$_3$ from MnCO$_3$ comprises the step of:
   calcinating MnCO$_3$ at 673-873K for 2-6 hours in air.

10. The method according to claim 8, wherein the step of preparing MnO from MnCO$_3$ comprises the steps of:
    calcinating MnCO$_3$ at 673-873K for 3-6 hours under a hydrogen atmosphere, and
    cooling to room temperature under a nitrogen atmosphere.

11. The method according to claim 8, wherein the step of preparing Mn$_3$O$_4$ from MnO comprises the steps of:
    aging MnO at room temperature for 3-6 hours in air, and
    further aging at 673-693K for 2-6 hours in air.

12. The method according to claim 8, wherein the step of preparing the catalyst from the slurry comprises the steps of:
    forming particles having a particle size of 2-3 mm from the slurry,
    aging the particles for 2-4 hours, and
    heating at 473-573K for 4-6 hours.

13. An air purifier, comprising the catalyst according to claim 1.

14. The air purifier according to claim 13, wherein the catalyst is arranged, as seen in the direction of air flow, after a particle filter, an electrostatic filter and/or an active carbon filter.

* * * * *